US007055132B2

(12) United States Patent
Bogdan et al.

(10) Patent No.: US 7,055,132 B2
(45) Date of Patent: May 30, 2006

(54) SYSTEM AND METHOD FOR ASSOCIATING PROPERTIES WITH OBJECTS

(75) Inventors: Jeffrey L. Bogdan, Redmond, WA (US); Mark J. Finocchio, Redmond, WA (US); Nicholas M. Kramer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 10/187,012

(22) Filed: Jun. 28, 2002

(65) Prior Publication Data

US 2004/0002991 A1    Jan. 1, 2004

(51) Int. Cl.
*G06F 9/44* (2006.01)

(52) U.S. Cl. .................................................... 717/116

(58) Field of Classification Search ........ 717/100–116, 717/146, 165–167; 719/315, 318; 709/202, 709/217, 223, 249; 707/6, 102; 710/15
See application file for complete search history.

(56) References Cited

U.S. PATENT DOCUMENTS

| 5,187,786 | A | | 2/1993 | Densmore et al. ........... 395/600 |
|---|---|---|---|---|
| 6,083,276 | A | * | 7/2000 | Davidson et al. ............ 717/107 |
| 6,191,790 | B1 | * | 2/2001 | Bogdan ....................... 345/426 |
| 6,230,159 | B1 | | 5/2001 | Golde ......................... 707/103 |
| 6,336,211 | B1 | | 1/2002 | Soe ................................ 717/1 |
| 2001/0029604 | A1 | | 10/2001 | Dreyband et al. ............... 717/7 |
| 2004/0088448 | A1 | * | 5/2004 | Joshi et al. .................... 710/15 |

OTHER PUBLICATIONS

Jakarta/Apache, "Xpath traversal of JavaBeans—Version 1.0-Beta1", Jun. 13, 2002; 4 of 4 <http://jakarta.apache.org/commons/jxpath/apidocs/org/apache/commons/jxpath/util/ValueUtils.html>.*
Java 2 v 1.3.1, "Java 2 Platform SE v1.3.1: Class PropertyDescriptor", Jun. 4, 2002; 6 of 6 <http://java.sun.com/j2se/1.3/docs/api/java/beans/PropertyDescriptor.html>.*
Horwith, Michael, "Constructing a Base Class for Data Maintenance, Part 2", Data Based Advisor, vol. 12, No. 8, Aug. 1994.
Pfeifer, Daniel, "Flexible Object-Oriented Views Using Method Propagation", Object-Oriented Information Systems, 8th International Conference, OOIS 2002. Proceedings (Lecture Notes in Computer Science vol. 2425), 2002, pp. 521-535.

* cited by examiner

*Primary Examiner*—Kakali Chaki
*Assistant Examiner*—Tuan A. Vu
(74) *Attorney, Agent, or Firm*—Merchant & Gould P.C.

(57) ABSTRACT

Described is a mechanism for allowing new functionality for an object to be expressed as a property that is not built into the class from which the object derives. More specifically, the mechanism associates properties in one class with another class. A computer-readable medium, that includes an object having a property in a first set of properties, further includes a data structure. The data structure includes definitions for each of a second set of properties and includes at least one static method. The static method is associated with one property out of the second set of properties and includes a first parameter. The first parameter uniquely identifies the one property. The static method is operative to associate the one property with the object without specifying an explicit reference to the one property in the object. The property is registered during run-time in order to receive the unique identifier.

29 Claims, 6 Drawing Sheets

SYSTEM AND METHOD FOR ASSOCIATING PROPERTIES WITH OBJECTS

FIELD OF THE INVENTION

The present invention relates generally to software applications, and, more particularly, to mechanisms for managing properties of objects within a software application.

BACKGROUND OF THE INVENTION

Most programming models today support the concept of classes. These classes are typically structured in a hierarchical tree having branches that represent different classes in the class hierarchy. When two branches are at different levels, the lower branch represents a child class. The child class inherits information from the class associated with the upper branch (i.e., the parent class). When two branches are at the same level, the classes are referred to as sibling classes. For the purposes of the following discussion, when referring to a child class in relation to a parent class, the terms, lower class and upper class, may be used to refer to the child class and the parent class, respectively. The uppermost branch in the hierarchy represents a base class in the hierarchical class tree. Typically, information in each class includes properties, methods, and events. The properties describe characteristics associated with the class. For example, a button class may have properties such as width, background color, font type, visible, and pressed. When one of these classes is instantiated, an object of that class is created. Each property in the object has an associated value, which can be queried and set during run-time operation. The value that is queried or set may be expected to conform to a specific data type if the syntax is strongly typed. Having syntax that is strongly typed is desirable because errors can be detected within a software application before run-time operation.

Once the class hierarchy is in place, adding new functionality to objects within the class hierarchy presents a problem. In one programming model, the new functionality is forced into the base class. When this is done, the base class becomes very large (e.g., one hundred methods, fifty properties, and twenty events), which results in an almost unmanageable object hierarchy. One undesirable outcome of this programming model is that the number of properties, methods, and events within the base class becomes overwhelming for developers to fully understand before implementing desired features into objects they create. Yet another undesirable outcome of this programming model is that the memory requirements become enormous due to the fact that values for the properties are stored locally. Because the values are stored locally, applications created with this programming model do not scale well.

This programming model also causes other problems for third party developers. Third party developers who wish to add new functionality must add a child class at the bottom of the hierarchy. Because the new child class is at the bottom of the hierarchy, the new functionality is not available to other classes within the hierarchy. Therefore, third party developers may need to add the new functionality to several child classes. As one can imagine, this results in code duplication, which impacts the maintainability of the object hierarchy. For the above reasons, this programming model is not very desirable.

Until the present invention, a programming model that allowed new functionality to be provided to a class within an existing class hierarchy without the above shortcomings has eluded those skilled in the art.

SUMMARY OF THE INVENTION

The present invention provides a mechanism that allows new functionality to be provided to a class without having the new functionality become a permanent part of the class. In addition, the present invention allows the new functionality to be expressed as a property that is not built into the class. In general, the present invention provides a mechanism for associating properties in one class with another class. This association is easily modifiable so that other sets of properties may be associated with the class.

In one embodiment, a computer-readable medium that includes an object having a property in a first set of properties, further includes a data structure. The data structure includes definitions for each of a second set of properties and includes at least one static method. The static method is associated with one property out of the second set of properties and includes a first parameter. The first parameter uniquely identifies the one property. The static method is operative to associate the one property with the object without specifying an explicit reference to the one property in the object.

In one aspect of the invention, the static method supports a strongly typed syntax.

In another aspect of the invention, the static method includes retrieving a value for the object without having the value stored locally on the object. The value may be retrieved from several stages, such as a parent object or a property sheet.

One advantage of the present invention is that the dividing of properties into one or more subsets allows each subset of properties to be more easily maintained. Another advantage of the present invention is that the object hierarchy is more extensible and allows developers to add functionality to the object hierarchy that impacts the base class and all lower classes.

Another advantage of the present invention is that managing storage for the properties in the objects becomes more efficient and convenient.

Yet another advantage of the present invention is that the programming model operates within a programmatic or a markup environment. In addition, the programming model operates in strongly typed programming languages, such as C++ and C#. In addition, the programming model supports property sheets, change notifications and value inheritance.

Another advantage of the present invention is that independent libraries can coexist because name conflicts are less likely because the name of the attached class effectively becomes part of the property name. Therefore, if two different developers each create an attached property having a property named "color", the two attached properties will not conflict.

DETAILED DESCRIPTION OF THE PREFERRED EMBODIMENT

Briefly stated, the present invention provides a programming model that allows new functionality to be provided to a class without having the new functionality become a permanent part of the class. In addition, the present invention allows the new functionality to be expressed as a property that is not built into the class. In general, the present invention provides a mechanism for associating properties in one class with another class. As will become apparent after reading the detailed description below, the programming model of the present invention provides dynamic properties to objects without building the properties into the object.

Figure 1:
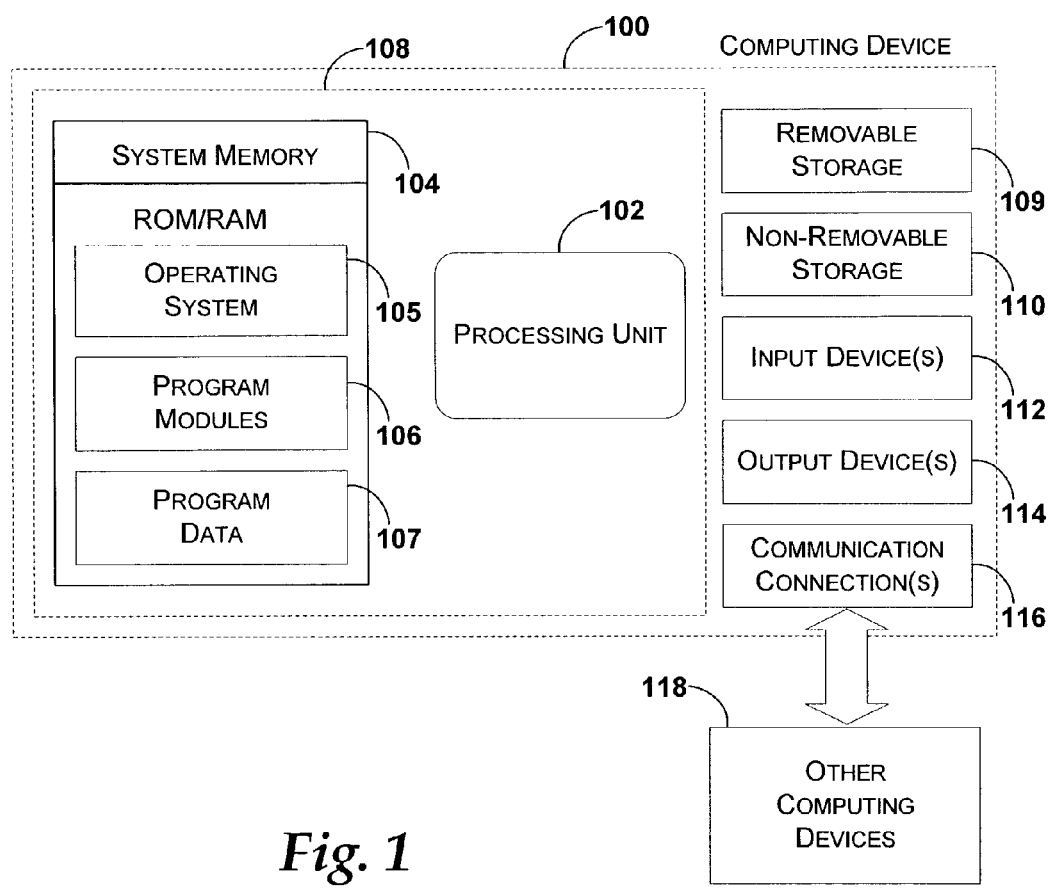
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include Visual Studio IntelliSense from Microsoft Corporation of Redmond, Wash., and other software programming environments, which utilize object libraries. In addition, program modules 106 include software applications created using a software-programming environment. When these software applications execute on processing unit 102, a property engine processes the software application in accordance with the programming model of the present invention. The property engine may be part of operating system 105 or may be another program module 106. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
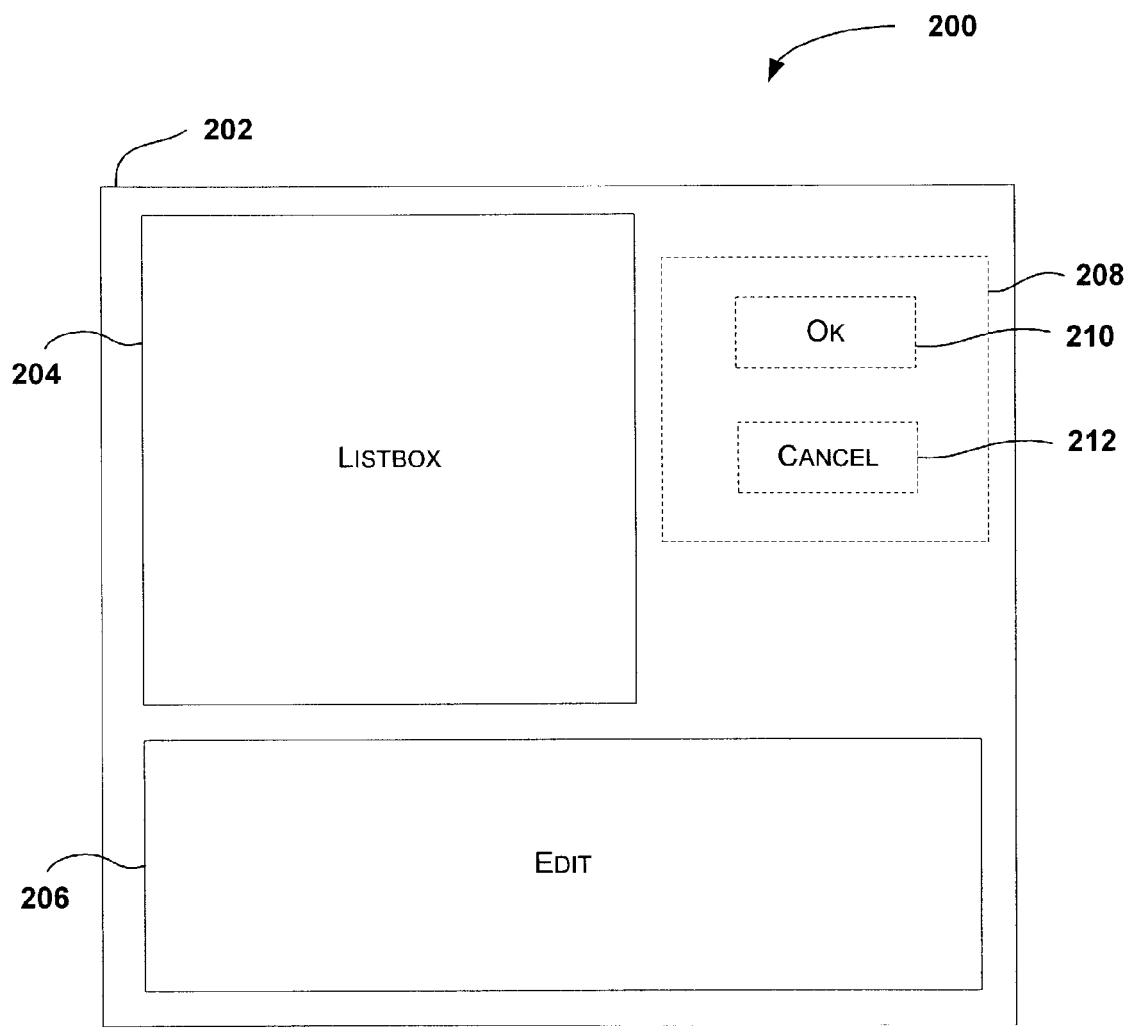
FIG. 2 is an exemplary display that may be created with the computing device of FIG. 1.

FIG. 2 is an exemplary display that may be created by an application within the programming environment in FIG. 1. While the programming model of the present invention may be used in various environments, by way of non-limiting example, FIG. 2 illustrates the use of the programming model within a user-interface environment. Thus, in this example, one of the applications in FIG. 1 creates display 200 shown in FIG. 2. The display 200 includes a dialog box 202. The dialog box 202 may include any number of other controls (i.e., objects). In this example, the dialog box 202 includes a list box 204, an edit box 206, and a container object 208 having two button objects (e.g., an OK button 210 and a CANCEL button 212). As will be discussed in further detail later in conjunction with FIG. 3, using conventional programming techniques, each of these objects (e.g., 202–212) is a child object derived from a base object (e.g., an element class). In addition, in accordance with one embodiment of the present invention, each child object may also be derived from a node class. As will be described later, this node class provides the "attaching" feature for the attached properties.

While the appearance of display 200 may appear similar to displays created using prior programming models, the mechanism for creating the display 200 is quite different. In prior programming models, the software code implementing display 200 would have had both the behavior of the object and the appearance of the object incorporated within each object itself or in one of the parent objects. However, as will be described in detail below, in accordance with the present invention, separate classes provide the actions and the appearance for objects 202–212 without resorting to an explicit reference between the two classes.

This allows developers to modify either the action portion or the appearance portion without modifying the entire object. Thus, in this user-interface example, each object is factored into two parts. One part relates to the action (i.e., behavior) associated with the object, and, the other part relates to the appearance (i.e., rendering) of the object. Because the rendering is separated from the behavior of the object, the appearance of the object may be easily modified to change the way the object appears.

While the above user-interface example conveniently factors the properties for the objects into a behavior group and an appearance group, the inventors have determined that properties of many objects in various environments can be conveniently divided into two or more relevant groups.

Then, in accordance with the present invention, these relevant groups can be "implicitly" associated with each other to fully implement the object. This "implicit" association provides several advantages over prior programming models. One of the advantages is that third party developers can conveniently modify the relevant group that pertains to their application while keeping the other groups untouched. This greatly simplifies the amount of information that the developer needs to know in order to change the functionality of the object. In addition, the object hierarchy becomes more manageable. Another advantage is that storage is reduced because each object does not necessarily maintain a local value with a current state. Rather, as will be described in detail in conjunction with FIG. 6, the state may be retrieved from various sources when needed.

Figure 3:
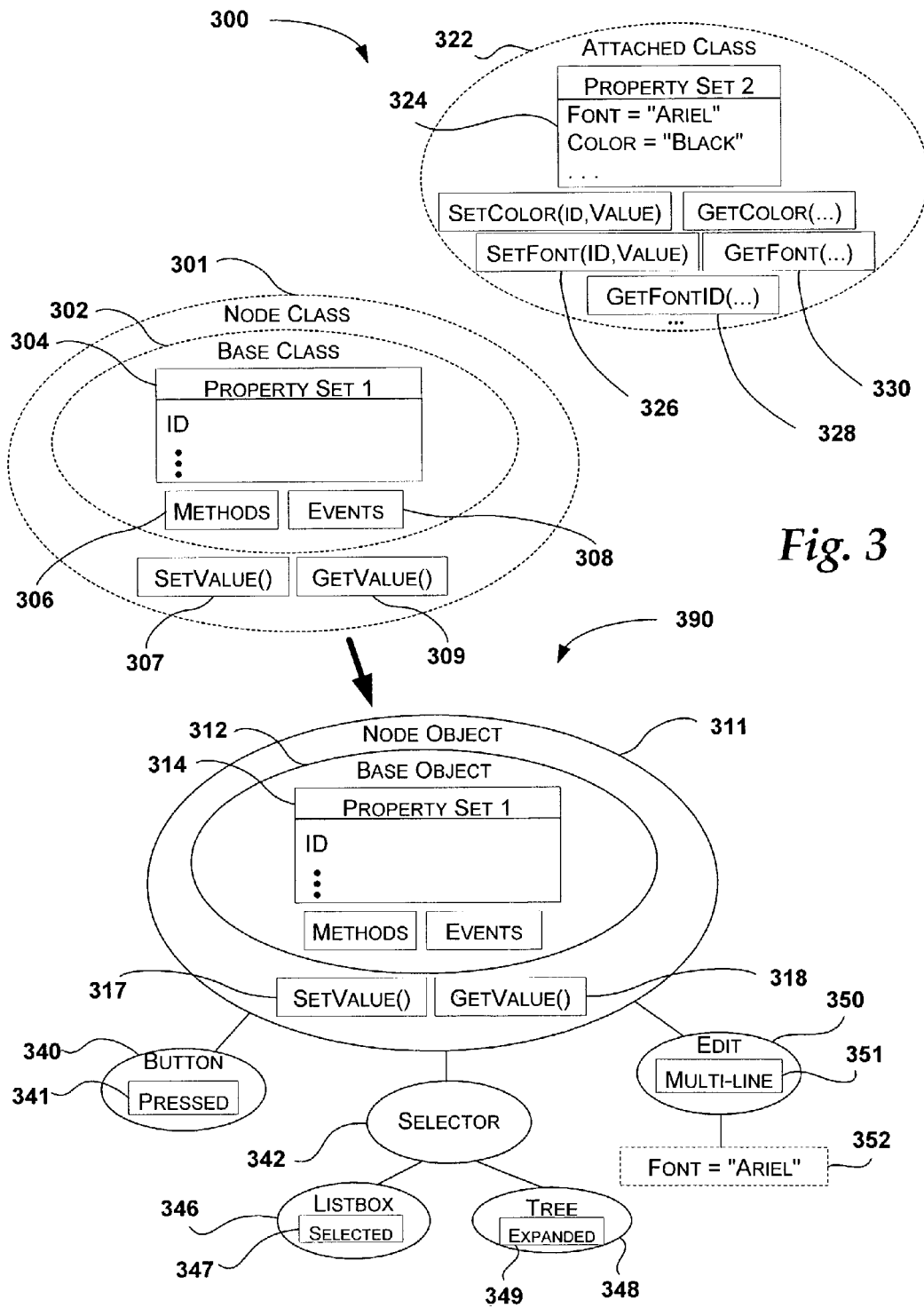
FIG. 3 is a graphical representation of a programming model that allows properties from one class to be attached to another class in accordance with the present invention.

FIG. 3 is a graphical representation of a programming model 300 that provides a mechanism for "implicitly" associating relevant groups of properties from one class with another class in accordance with the present invention. Similar to other programming models, the present invention supports a base class 302. The base class 302 includes a first set of properties 304 associated with base class 302. In addition, base class 302 includes a set of methods 306 and a set of events 308. However, in accordance with the present invention, the base class is derived from a node class 301. The node class 301 provides a SetValue( ) method 307 and a GetValue( ) method 309.

A second set of properties 324 is included within an attached class 322. The attached class 322 also includes at least two static methods associated with each of the second set of properties 324 (e.g., SetFont( ) 326 and GetFont( ) 330). These static methods may be thought of as global methods that are accessible to objects that have registered the property associated with the static method. The developer supplying the attached class 322 is responsible for writing the code for each of these static methods 326 and 330. The code will include a call to one of the methods provided by the node class 301. For example, an application calling SetFont( ) 326 for a specific identifier PropertyID and a given font Value, will ultimately execute the call to SetValue( ) 307 in the node class 301. The parameters that SetFont( ) 326 passes to the call to SetValue( ) 307 will include the specific identifier PropertyID and the given font Value that were provided in the SetFont( ) 326 call. An exemplary SetFont( ) function may appear as follows:

```
SetFont(PropertyID,white)
{   PropertyID->SetValue(PropertyID,white);
}.
```

One skilled in the art will appreciate that the attached class, thus, provides strong typing for any attached property. While the present invention supports the application calling the SetValue( ) 307 directly, this circumvents the advantage of providing strong typing during compile time. As mentioned earlier, strong typing allows errors to be detected before run-time operation. In another embodiment, the attached class 322 provides an additional static method (e.g., GetFontID( ) 328) for each of the attached properties 324. This additional static method is operative to test whether the requested attached property has been registered. Thus, this additional static method 328 is used to insure that the application has properly registered the attached property before attempting to perform the set and get static methods on the attached property. For example, if GetFontID( ) 328 detects that the Color attached property has not been registered, GetFontID( ) may give an error, may automatically register the Color attached property for the requesting object, or the like.

The following is an exemplary embodiment for providing the delayed registration:

```
class FontProvider
{   public static Font GetFont(Node n)
    {   return n.GetValue(GetFontID( ));   }
    public static void SetFont(Node n, Font newFont)
    {   n.SetValue(GetFontID( ), newFont);   }
    public static DynamicProperty GetFontID( )
    {   // Delay register Font property if necessary
        if (FontID == null)
        {   FontID = RegisterProperty("Font", typeof(Font), "Arial", . . . );
        }
    }
    private static DynamicProperty FontID = null;
}
```

Similar to other programming models, the present invention supports child classes (not shown) of base class 302. For simplicity, FIG. 3 does not graphically illustrate any child classes of base class 302 or any other attached classes, and, therefore, does not illustrate child classes being associated with another attached class. However, one skilled in the art, after reading the following description, will be able to easily design an application that has child classes referencing other attached classes. In general, any class may be a "provider" of attached properties, as long as the class provides the necessary static methods for the attached properties.

The attached class 322 allows third party developers the ability to dynamically add properties and functionality to their applications without modifying the base class 302. Similar to modifying properties within base class 302, the added properties (e.g., second set of properties 324) affect objects within an entire hierarchical object tree 390. The attached class 322 is not instantiated during the execution of the application. Therefore, for each object instantiated from base class 302, the same attached class (attached class 322) may provide the second set of properties 324 to each of these objects.

During run-time of the application, a base object 312 becomes instantiated. In addition, one or more child objects (e.g., child objects 340–350) become instantiated. The instantiation of the objects in object tree 390 may be through programmatic control (e.g., C#), through markup language (e.g., XML), or through other means. When the object tree 390 is created through programmatic control, a compiler typically identifies whether the instructions implementing the attached class 322 has any errors, such as illegal name or data type. As discussed above, the attached class 322 provides strong typing. Therefore, errors may be caught before run-time. In addition, software development tools may detect errors during development of the application. When object tree 390 is created through markup language, a parser interprets markup statements. In general, a name of a tag in the markup language is the name for the corresponding class.

Each of these child objects 340–350 may include one or more child properties (e.g., child property 341) within child object (e.g., child object 340). Values for child properties may be stored in the associated child object. However, in accordance with the present invention, the child objects do not necessarily have local storage for storing a value. In addition, each of these child objects 340–350 may include one or more attached properties (e.g., attached property 352 represented within dashed box) associated with the child object. As will be described in detail in conjunction with FIG. 6, attached property 352 may obtain its value from local storage associated with child object 350, may obtain its value through inheritance (e.g., base object 312), through a property sheet (not shown), through programmatic methods (e.g., static method 330 in conjunction with method 309), and through other means in accordance with the present invention. While these values for the attached properties are associated with the child object, the storage for these values is not typically part of the child object.

Again, FIG. 3 illustrates the programming model in a user-interface environment. Thus, one will note that the properties within base object 312 and child objects 340–350 relate to the behavior of the objects. Base object 312 represents a dialog object, child object 340 represents a button object, child object 350 represents an edit box, and child object 342 represents a selector object having two child objects 346 and 348, representing a list box and a tree, respectively. Each of these child objects 340–350 includes one or more child properties (e.g., child property 341), such as a pressed property for button object and expanded property for tree object.

In contrast, the properties within attached class 322 relate to the appearance for the object. For example, the second set of properties may include a property and default value for font type, color, and the like. This programming model is configured to set a property at run-time on the child objects. To that extent, the attached property (e.g., attached property 352) in each of the child objects is configured to receive the value from the attached class.

Figure 4:
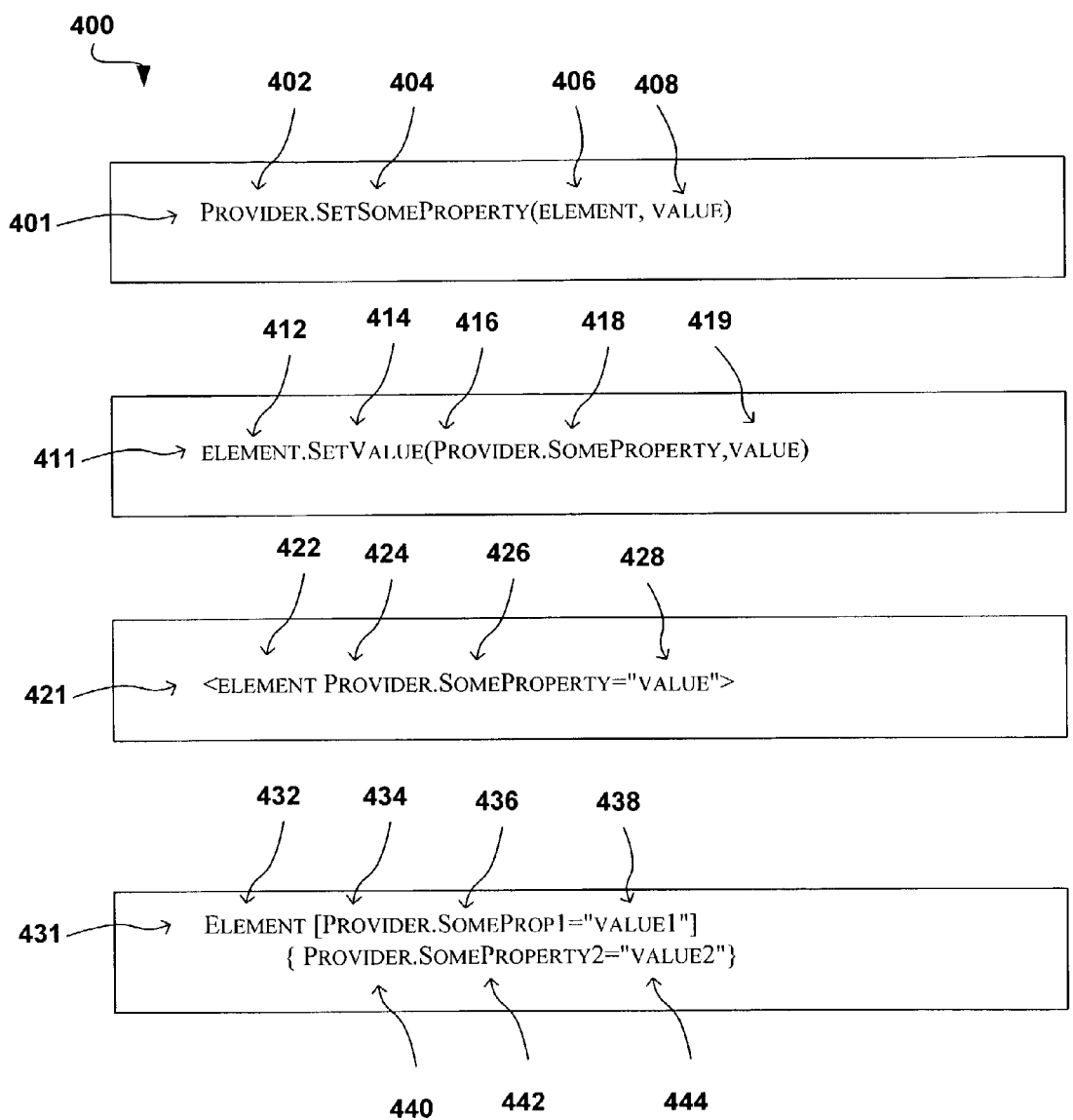
FIG. 4 illustrates several exemplary syntaxes for implementing the programming model shown in FIG. 3.

FIG. 4 illustrates several exemplary syntaxes for various operating environments in which the programming model shown in FIG. 3 may be implemented. The use of the term "Provider" within each of the exemplary syntaxes denotes that the static methods described in the syntaxes are associated with an attached class having a name of "Provider". Thus, because each of these syntaxes allows the attached class to be named, properties that are named identically within two different attached classes will not conflict with each other. This allows developers to develop attached property classes without having to be wary of potential naming conflicts.

Now turning to the exemplary syntaxes, if the programming environment is a programmatic language, such as Visual Basic or C#, pseudo code may appear as shown in programmatic syntax 401. Programmatic syntax 401 includes a class identifier 402 that identifies the class as containing an attached property. Programmatic syntax 401 further includes a method identifier 404, a parameter list having a first identifier 406 for specifying a name for a property and a second identifier 408 for specifying a value associated with the property specified in the first identifier 406. The parameter list is enclosed within parenthesis and a period separates the class identifier 402 and method identifier 404. Referring to the attached class 322 shown in FIG. 3, for attached property "FONT", the programmatic syntax 401 is as follows:

Attached Class.SetFont(PropertyID, value).

Interestingly, this syntax appears to look similar to syntaxes in previous programming models. However, the syntax is not identical and programmatic syntax 401 is different than prior syntaxes. For example, in programmatic syntax 401, method identifier 404 identifies a static method on a Provider class (i.e., attached class 322 in FIG. 3). In prior programming models, method identifier would have identified an instance method on a Provider instance. Because the present invention utilizes the Provider class (i.e., the Attached Class 322 in FIG. 3), the programming model can support extender properties in markup and property sheets because the lifetime of the Provider instance does not need to be tracked. Another feature of programmatic syntax 401 is that the syntax is strongly typed. As mentioned earlier, a strongly typed syntax enables good tool support because potential errors, such as misspelled names, incorrect data types, and the like, can be detected at compile time rather than at run-time.

In addition, for programming environments such as Visual Basic, C# or the like, the programming model also allows a loosely typed syntax (i.e., programmatic syntax 411). Programmatic syntax 411 includes an object identifier 412 identifying a target object, a method identifier 414 identifying a static method within an attached property class, a parameter list including an attached property identifier and a value 419. The attached property identifier includes a class identifier 416 and a property identifier 418 that identifies the attached property within the associated attached class.

In another embodiment, the programming model may be implemented using markup language syntax, such as markup syntax 421. Markup syntax 421 includes a tag 422, an attached property having a provider designator 424 and a property identifier 426, and a value 428. In one embodiment, the tag 422 is the name of the target object (e.g., button object 340 in FIG. 3). Typically, markup syntax 421 begins and ends with an open and close symbol, "<" and ">", respectively. Again, a parser performs processing to locate where the attached properties exist because the attached properties are not directly on the class.

In yet another embodiment, the programming model may be implemented using extensible Markup Language (XML) with style sheets, such as style sheet syntax 431 shown in FIG. 4. For this embodiment, the style sheet syntax 431 includes a "tag" attribute 432. The tag attribute 432 corresponds to the class that is requesting processing. One illustrative example for attached properties in XML is as follows:

<Button xmlns:ap="expandoNameSpace" Pressed="false" ap:Expandos.String="string"/>

Figure 5:
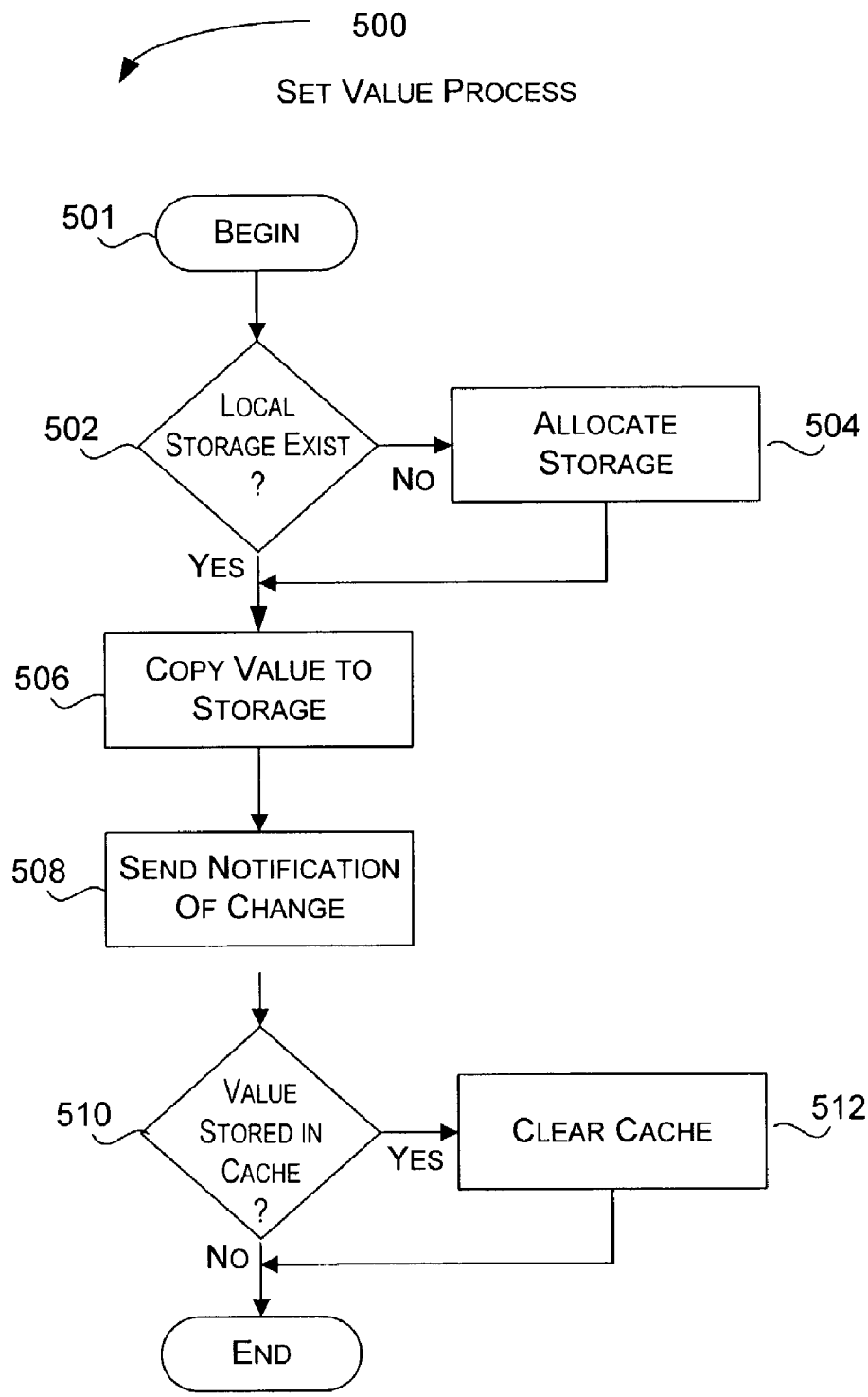
FIG. 5 is a logical flow diagram illustrating a process for setting a value in accordance with the present invention.
Figure 6:
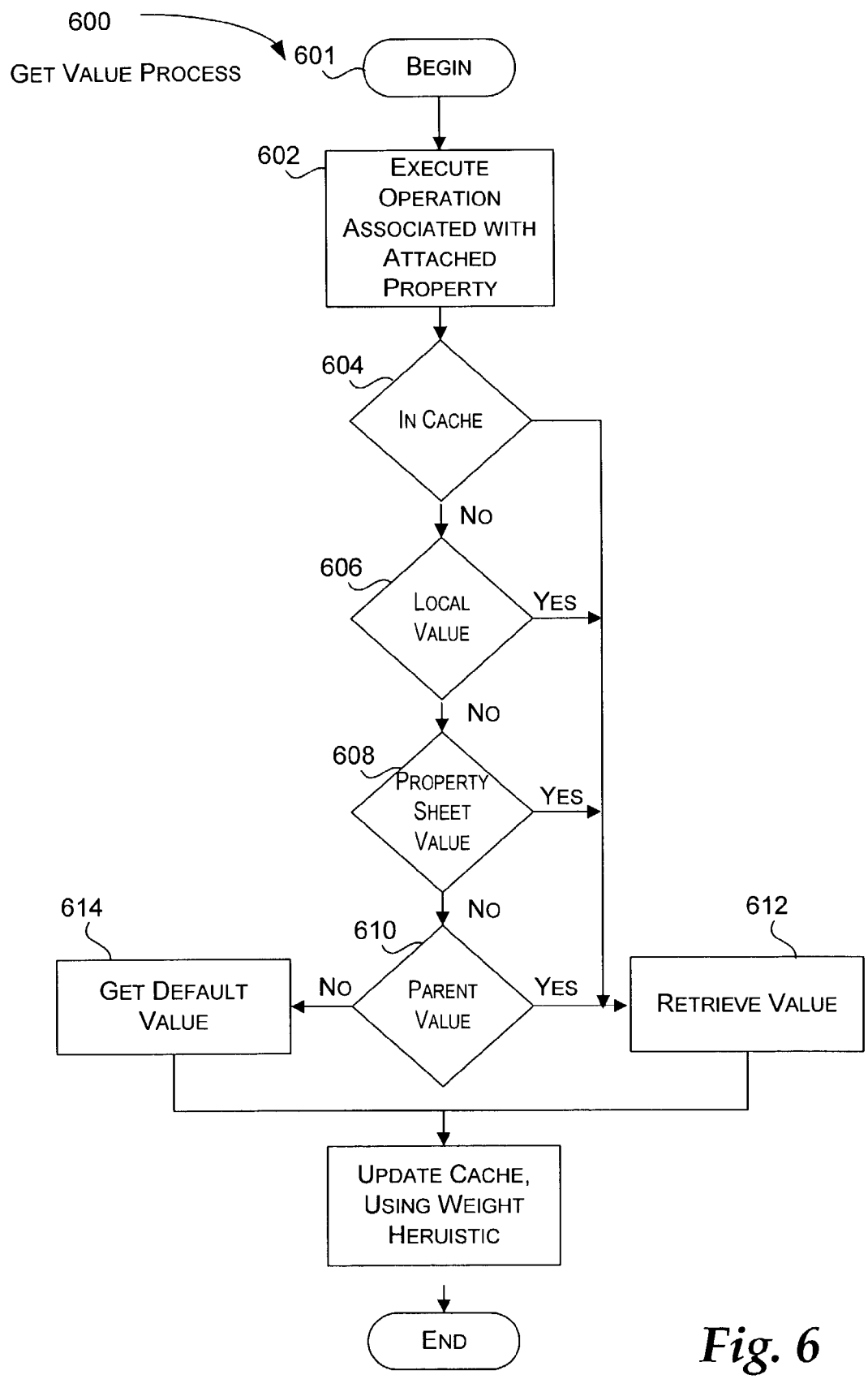
FIG. 6 is a logical flow diagram illustrating a process for retrieving a value in accordance with the present invention.

When an application implementing attached properties in accordance with the present invention executes, the application instantiates the objects in the object tree. Then, the application, in conjunction with the property engine, handles the run-time operations, which includes retrieving and setting values for the objects. FIGS. 5 and 6 illustrate processing performed by the application, in conjunction with the property engine.

However, before either the SetValue( ) process or the GetValue( ) process, shown in FIGS. 5 and 6, may be performed, the attached property that is specified within either of these two processes must be registered. As mentioned above, one embodiment may perform a check to determine whether the property has been registered. This check (e.g., GetFontID( ) 328) may be performed within any of the static methods that correspond to the attached property (i.e., SetFont( ) 326 and GetFont( ) 330). Because this check must be preformed each time any of the static methods are called, this embodiment incurs a performance penalty. Those skilled in the art will appreciated that other embodiments that optimize the registration of the property may be implemented without departing from the present invention, such as requiring the application to perform the registration.

The registration of the attached property returns a unique PropertyID for the attached property. One illustrative call for registering a property may be in the form as follows:

BarDP=RegisterProperty("Bar",0,typeof(string),typeof(Button),0x3);.

In this embodiment, the BarDP variable will then contain the unique identifier for the attached property. This unique identifier is then used in the SetValue( ) and the GetValue( ) function calls. In one embodiment, the RegisterProperty is called, directly or indirectly, from the owner's static constructor. The owner refers to the class that attaches the attached property. Once the attached property is registered, any instance that matches the target type for the attached property may "implicitly" attach the property by calling the Get and Set static methods associated with the attached property.

As shown above in the exemplary call for registering a property, "Bar" designates a name for the attached property. The property engine typically does not use this name. However, a parser uses this name to determine whether a property with the same name as already been registered to the owner. The target type is Button. For attached properties, the owner and the target will not be the same. The default value is "0". As will be described in detail in conjunction with FIG. 6, the property engine determines where to retrieve a value for the attached property. Therefore, the registerProperty call includes behavior bits that identify stages in which a value for the property is searched, such as inheritance, property sheets. In the above exemplary call, the behavior bits "0x3" indicates that a local value, a property sheet, and inheritance are searched in order to determine the value for the attached property. Thus, in one embodiment, the interpretation of these behavior bits may be coded within the GetValue( ) static method. Alternatively, the determination of these stages may be provided by an expression that models relationships between properties in a formal manner as described in the commonly assigned co-pending application entitled "Extensible On-Demand Property System", patent application Ser. No. 10/186,985, filed on Jun. 28, 2002, now issued as U.S. Pat. No: 6,986,123, which is hereby incorporated by reference.

In one embodiment, the code for an attached class may take the form shown in Table 1.

TABLE 1

```
class BarProvider: Object {
    public static DynamicProperty BarDP = RegisterProperty(
        "Bar", 0, typeof(string), typeof(Button));
    public static string GetBar(Button button) {
        return (string) button.GetValue(BarDP); }
    public static void SetBar(Button button, string value) {
        button.SetValue(BarDP, value); }
}.
```

In the above code, the attached property named "Bar" is defined within attached class "BarProvider". The attached property name "Bar" is defined with a data type as string and can only be attached to Button objects. The static methods are strongly typed and allow access to the property and setting the property.

Once the attached property has been registered, the SetValue( ) and GetValue( ) functions may be performed. FIG. 5 is a logical flow diagram illustrating a process for setting a value in accordance with the present invention. Processing begins at block 501, where the set function has been initiated to change a value associated with some property. In general, the SetValue process 500 will store the value locally for a property of interest (hereinafter referred to as the interested property). Processing continues at decision block 502.

At decision block 502, a determination is made whether local storage exists for the interested property. Because the present invention does not automatically have storage for each property for each instance of an object, if the interested property has not previously had a value stored for it, storage is allocated (block 504). Once storage has been allocated, processing continues to block 506, as it would have if it had detected local storage at decision block 502.

At block 506, the value is copied into the storage associated with the interested property. Once the interested property has changed states, notifications are sent of the change in state (block 508). In one embodiment, this notification may involve setting a dirty bit to indicate to dependent properties that their state may not be valid anymore. Alternatively, the notification may involve reporting to each dependent that a source has changed as described in the above-mentioned patent application. Processing continues at decision block 510.

At decision block 510, a determination is made whether a value was stored in the cache for the interested property. If there is not a value in the cache for this interested property, the process ends. However, if there is a value in the cache, the cache is cleared (block 512) because this value is no longer valid. The process then end.

FIG. 6 is a logical flow diagram illustrating a process for retrieving a value in accordance with the present invention. Processing begins at block 601, where the query has been initiated. Processing continues at block 602.

At block 602, the application indicates that one of the properties of interest (hereinafter, referred to as interested property) needs updating. Typically, this may occur when an object is querying properties for their current state. The process 600 determines a value for the property by checking various stages. These stages are defined when the property is registered. Decision blocks 606–610 represent exemplary stages, but other stages may be added without departing from the present invention. Processing continues at decision block 604.

At decision block 604, the process checks the cache to determine whether the interested property has been previously cached. Typically, interested properties are cached in order to optimize retrieval. If the property has been previously cached, the process continues at block 612, where the value is retrieved from the cache. Alternatively, the process continues at decision block 606. At decision block 606, a determination is made whether the value for the interested property is local. The value will be local if a SetValue( ) has been performed to set a value locally for the property, as described in FIG. 5. If the value is local, the process continues at block 612, where the value is retrieved from local storage. If the value is not local, the process continues at decision block 608.

At decision block 608, a determination is made whether the value for the interested property is available in a property sheet. When a base class has an associated property sheet, the property sheet specifies how each of the children of the base class will be rendered once instantiated. If the interesting property is available in a property sheet, processing continues at block 612, where the value is retrieved from the property sheet. However, if the value is not in the property sheet, processing continues at decision block 610.

At decision block 610, a determination is made whether the value for the interested property may be obtained through inheritance (i.e., an inherited value). Inherited values are derived from a parent object of the child object. If one of the parent objects has the interesting property, processing proceeds to block 612, where the value is retrieved from the parent object. However, if the value is not inherited, a default value from the attached class associated with the attached property is retrieved (block 614). Processing continues at block 616.

At block 616, the application calculates a weight metric based on the stage at which the value was received. The weight metric is stored and is used to make educated decisions on which interested properties to cache in order to optimize future retrievals. Processing then ends.

In addition, to the SetValue and GetValue processes described above, the programming model of the present invention provides enhanced functions, such as group queries or group notification. Thus, as described, the present invention provides a programming model that provides a dependency-based property system, which supports complex relationships between properties through the use of attached classes. Applications built using this programming model scale very well because the property management technique does not require excessive local, per-instance based storage. Instead, the programming model promotes reuse of property values, such as through the use of property sheets and inheritance at the base class level. As described above, the present invention provides a property management mechanism whereby objects in the object hierarchy store property values through attaching.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium having computer-executable instructions for associating a first object having a first property with a second property in a second object, the instructions when executed perform a method comprising:
    identifying the second object, wherein the second property is associated with a first parameter in the second object;
    associating the second property with the first object without specifying an explicit reference to the first property in the first object;
    calculating a weight metric based on the location of the first parameter;
    caching the second property based on the weight metric; and
    instantiating the first object with the first parameter.

2. The computer-readable medium of claim 1, wherein the associating supports a strongly typed syntax.

3. The computer-readable medium of claim 1, wherein the instantiating further comprises retrieving a value for the second property from a location external to the first object.

4. The computer-readable medium of claim 3, wherein retrieving the value further comprises determining which one of a plurality of stages holds the value associated with the second property.

5. The computer-readable medium of claim 4, wherein one stage includes a parent object of the first object.

6. The computer-readable medium of claim 4, wherein one stage includes a property sheet.

7. The computer-readable medium of claim 1, wherein the associating further comprises associating a second parameter with the first object by assigning a value to the second parameter, and wherein the value is stored in a location external to the first object.

8. The computer-readable medium of claim 1, wherein the first property corresponds to behaviors associated with the first object, and the second property corresponds to an appearance of the first object.

9. A computer-readable medium having computer-executable components for implementing an object-oriented class instantiation, comprising:
    a base class including a plurality of properties; and
    an attached class including a plurality of attached properties, wherein when executed the components perform the following:
    at least one of the attached properties is associated with an instance of a corresponding base object,
    the base object is instantiated by retrieving an attached property value without specifying a reference to any of the base properties in the base class,
    the attached property is cached based on a weight metric that is calculated based on a location of the attached property value.

10. The computer-readable medium of claim 9, wherein the base object inherits at least one method from a node class, and further wherein the at least one method is called by a static method when the at least one attached property is associated with the instance of the corresponding base object.

11. The computer-readable medium of claim 10, wherein the static method and the at least one method each include a first parameter for passing a unique identifier for the at least one attached property.

12. The computer-readable medium of claim 11, wherein the unique identifier is available after registering the at least one attached property at run-time.

13. The computer-readable medium of claim 10, wherein the at least one method supports a loosely typed syntax.

14. The computer-readable medium of claim 10, wherein the static method supports a strongly typed syntax.

15. The computer-readable medium of claim 9, wherein the base object is instantiated by retrieving the attached property a value from a parent object associated with the base object.

16. The computer-readable medium of claim 9, wherein the base object is instantiated by retrieving the attached property value from a property sheet.

17. A computer system having computer-readable medium storm instructions for implementing an object-oriented class instantiation, comprising:
    a first object that is derived from a first class, wherein the first object comprises a first set of properties; and
    a second class that is arranged to attach one property of a second set of properties to the first object in response to an operation request associated with the first object without referencing the first set of properties, wherein when executed the components perform the following:
    the first object is instantiated with the attached property of the second set of properties, and further wherein the attached property is cached based on a weight metric that is calculated based on the location of the attached property value.

18. The computer system of claim 17, further comprising a first parameter that is arranged to uniquely identity the attached property.

19. The computer system of claim 18, wherein the attached property is registered before the first parameter uniquely identifies the attached property.

20. A computer-implemented method for associating a first object having a first property with a second property in a second object, comprising:
- identifying a value corresponding to the second property;
- registering the second property with the first object, wherein the second property is stored in a location external to the first object;
- calculating a weight metric based on a location of the value;
- caching the second property based on the weight metric; and
- instantiating the first object with the value.

21. The computer-implemented method of claim 20, wherein the registering further comprises assigning a unique identifier to the second property.

22. The computer-implemented method of claim 21, further comprising calling a static method having a first parameter, wherein the first parameter refers to the unique identifier.

23. The computer-implemented method of claim 22, wherein the static method is strongly typed.

24. The computer-implemented method of claim 20, wherein the first object is associated with a child object, and further wherein the child object is associated with the second property.

25. A computer-implemented system for associating an attached property to a base object, comprising:
- a processor;
- means for attaching an attached object to the base object;
- means for identifying the attached property in the attached object;
- means for associating the attached property with the base object without referencing a base property in the base object;
- means for calculating a weight metric based on the location of a value corresponding to the attached property;
- means for caching the attached property based on the weight metric; and
- means for instantiating the base object with the value.

26. The system of claim 25, wherein the means for associating supports a strongly typed syntax for a programmatic language.

27. The system of claim 25, wherein the means for associating supports loosely-type syntax for a programming language.

28. The system of claim 25, wherein the means for associating comprises a statement in a markup document.

29. The system of claim 25, wherein the means for associating comprises a statement in a property sheet.

* * * * *